(12) United States Patent
Sundar Singh et al.

(10) Patent No.: US 10,775,776 B2
(45) Date of Patent: Sep. 15, 2020

(54) DIGITAL MANUFACTURING WITH PRODUCT TRACKING AND SOCIAL MEDIA ANALYSIS OF THE PRODUCT

(71) Applicant: ACCENTURE GLOBAL SOLUTIONS LIMITED, Dublin (IE)

(72) Inventors: Paul Sundar Singh, Chennai (IN); Michael Busselmann, Duesseldorf (DE); Ishita Biswas, Munich (DE); Indira Boga, Chennai (IN); Srinath A. Srinivasan, Chennai (IN); Saravanan Ravi, Chennai (IN); Anandakrishnan Rajan, Chennai (IN); Deepa Rajendran, Chennai (IN); Sivakumar Raja Ramanathan, Chennai (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 58 days.

(21) Appl. No.: 16/195,532

(22) Filed: Nov. 19, 2018

(65) Prior Publication Data

US 2019/0155262 A1 May 23, 2019

(30) Foreign Application Priority Data

Nov. 17, 2017 (IN) .............................. 201711041188

(51) Int. Cl.
*G05B 19/418* (2006.01)
*G05B 13/02* (2006.01)
(Continued)

(52) U.S. Cl.
CPC ... *G05B 19/41865* (2013.01); *G05B 13/0265* (2013.01); *G06F 40/289* (2020.01);
(Continued)

(58) Field of Classification Search
None
See application file for complete search history.

(56) References Cited

U.S. PATENT DOCUMENTS

2016/0260108 A1* 9/2016 Bracewell .......... G06Q 30/0201
2018/0018708 A1* 1/2018 Locke .................. G02B 27/017

OTHER PUBLICATIONS

Raksha Sharma, et al., "Adjective Intensity and Sentiment Analysis", Proceedings of the 2015 Conference on Empirical Methods in Natural Language Processing, pp. 2520-2526, Lisbon, Portugal, Sep. 17-21, 2015.

* cited by examiner

*Primary Examiner* — Mohammad Ali
*Assistant Examiner* — Saad M Kabir
(74) *Attorney, Agent, or Firm* — Mannava & Kang, P.C.

(57) ABSTRACT

A digital manufacturing system includes a web portal to receive product configuration information. An enterprise resource planning subsystem generates a production order based on the product configuration information, and determines a manufacturing resource plan and production steps for manufacturing the product.
A manufacturing execution subsystem generates an identifier for the manufacturing resource plan, and communicate the manufacturing resource plan and the production steps to a production control subsystem controlling machines performing the manufacturing of the product according to the manufacturing resource plan and the production steps. A production control subsystem stores the identifier in a near field communication chip attachable to the product during the manufacturing to provide real-time tracking of the manufacturing throughout the steps. An empirical analysis subsystem connects to different social media applications to determine sentiment of the manufactured product.

20 Claims, 11 Drawing Sheets

(51) Int. Cl.
*G06Q 10/06* (2012.01)
*G06Q 50/04* (2012.01)
*G06Q 50/00* (2012.01)
*G06F 40/30* (2020.01)
*G06F 40/40* (2020.01)
*G06F 40/289* (2020.01)

(52) U.S. Cl.
CPC .............. *G06F 40/30* (2020.01); *G06F 40/40* (2020.01); *G06Q 10/0631* (2013.01); *G06Q 10/0639* (2013.01); *G06Q 50/01* (2013.01); *G06Q 50/04* (2013.01); *G05B 2219/13085* (2013.01); *G05B 2219/15038* (2013.01); *G05B 2219/31053* (2013.01)

4. Write SFC identifier to NFC tag.

3. Receive SFC identifier from MES subsystem.

2. Select Get SFC TAG.

1. Select Write SFC Tag.

7. Show customer details of the production order.

6. Read SFC identifier from NFC tag.

5. Select Read SFC TAG.

DIGITAL MANUFACTURING WITH PRODUCT TRACKING AND SOCIAL MEDIA ANALYSIS OF THE PRODUCT

PRIORITY

This patent application claims foreign priority to Indian patent application serial no. 201711041188, filed on Nov. 17, 2017, which is incorporated by reference in its entirety.

TECHNICAL FIELD

This patent application relates generally to digital manufacturing systems and processes.

BACKGROUND

Manufacturing companies have traditionally been slow to react to the advent of digital technologies like intelligent robots, sensor technology, artificial intelligence, nanotechnology, and three-dimensional (3D) printing. As a result, it still remains to be a very difficult task for a product developer to have their product manufactured in mass quantities. For example, in the current production scenario, a customer, such as a product developer, may provide an order to a customer services representative of the manufacturer. Through manual background processes, planning and component procurements are executed. The production order is then sent to the shop floor. The production order includes details of the product being produced, such as quantity, design, dimensions, production schedule, etc. A shop floor person executes the order in the production line and places the finished product in the warehouse for delivery. The logistics team will deliver the goods to the customer. One main challenge is the lack of end-to-end visibility for the customer throughout this process. Also, there is minimal quality control assurances provided to the customer throughout this process. The customer may not identify quality control issues until after manufacturing is completed.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
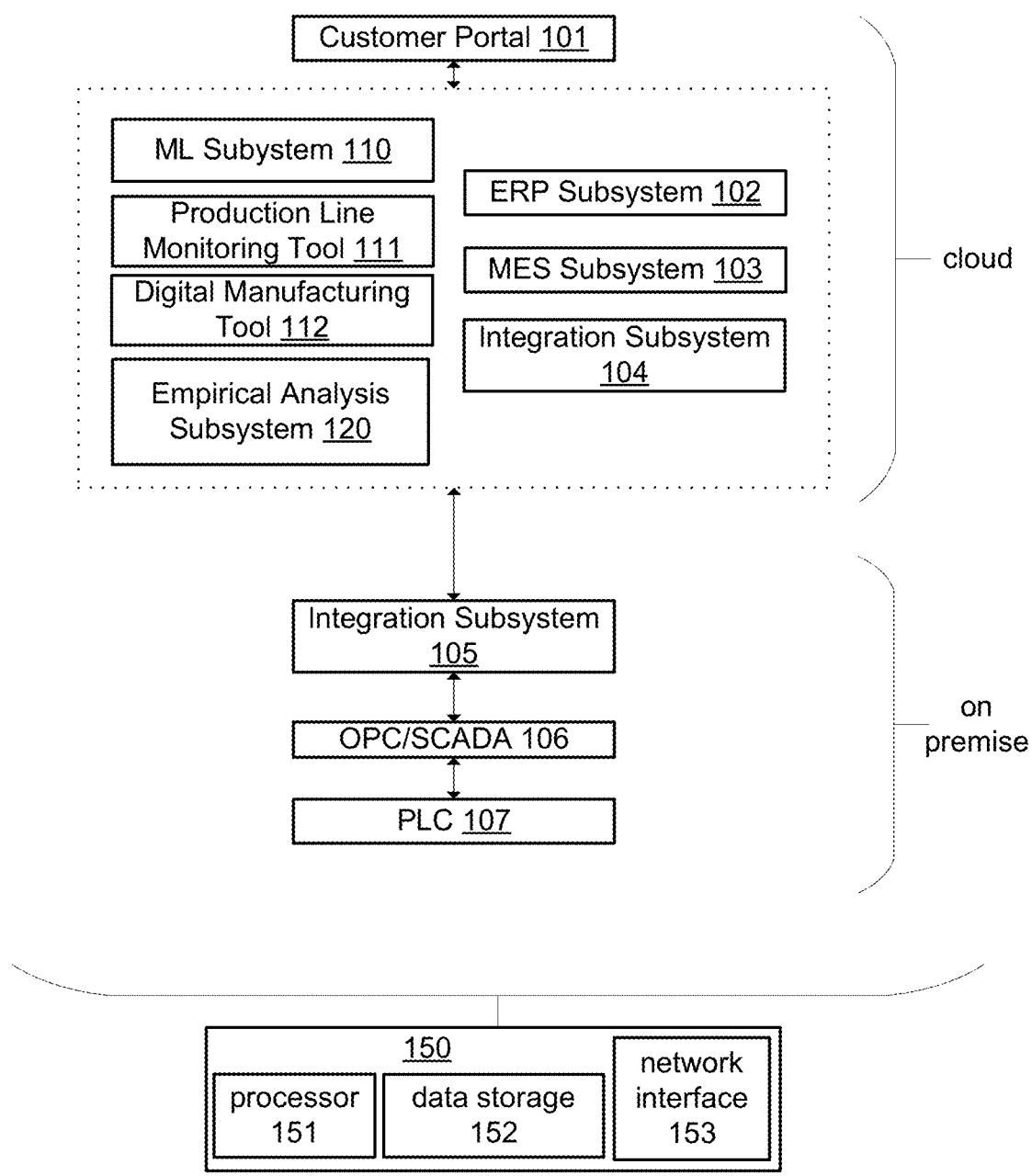
FIG. 1 shows an architecture of a digital manufacturing system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

Industry 4.0 is a current trend in automation and data exchange. There are four design principles in Industry 4.0. These principles support companies in identifying and implementing Industry 4.0 scenarios. The principles are interoperability, information transparency, technical assistance and decentralized decisions. Interoperability relates to the ability of machines, devices, sensors, and people to connect and communicate with each other via the Internet of Things (IoT) or the Internet of People (IoP). Information transparency relates to the ability of information subsystems to create a virtual copy of the physical world by enriching digital plant models with sensor data. Technical assistance relates to the ability of assistance subsystems to support humans by aggregating and visualizing information comprehensibly for making informed decisions and solving urgent problems on short notice. Secondly, technical assistance relates to the ability of cyber physical subsystems to physically support humans by conducting a range of tasks that are unpleasant, too exhausting, or unsafe for their human co-workers. Decentralized decisions relate to the ability of cyber physical subsystems to make decisions on their own and to perform their tasks as autonomously as possible. These principles provide a conceptual framework for automation of manufacturing technologies. However, actual implementation of these principles is difficult. Today's shop floor is a complex, continually varying environment, and integrating subsystems to implement these principles can be equally complex.

According to examples of the present disclosure, technological methods and systems are described that may integrate traditional shop floor manufacturing with enterprise resource planning (ERP) and manufacturing execution systems (MES's), which may be located on a cloud, along with techniques like Industrial Internet of Things (IIoT), augmented reality (AR), and machine learning (ML) to achieve agile manufacturing on configured products. These systems and methods may provide improved governance of geographically dispersed production sites. Also, overhauling machines with auto generation of service orders including information on correct tools and instructions to use may be achieved. Also, an in-depth live visibility of the production line using digital manufacturing tools and pre-defined key performance indicators (KPIs) may be achieved. Additionally, human and machine collaboration can be improved where automation replaces monotonous jobs, and artificial intelligence provides for cognitive analysis for control and decision-making actions.

FIG. 1 shows an architecture of a digital manufacturing system 100 according to an example of the present disclosure. One or more of the components of the system 100 may be hosted on platform 150 or multiple ones of the platform 150, which may include one or more computers, servers, etc. One or more of the components of the system 100 may include machine readable instructions stored on a non-transitory computer readable medium, such as data storage 152, and executed by a processor 151 or multiple processors. For example, the subsystems of the system 100 described below may include software comprised of machine readable instructions stored on a non-transitory computer readable medium and executable by at least one processor. The platform 150 may include a network interface 153 to communicate with other components of the system 100 via a network or to communicate with external systems via the network. Components of the system 100 are now described. The system 100 may include additional components not shown.

The system 100 may include a web portal, shown as customer portal 101. The web portal may include a web user interface (UI). The web UI may provide graphical user interfaces (GUIs) for customer product configuration, order placement, product description, tracking during manufacturing and for product delivery, KPIs for manufacturing, and product sentiment information. For example, a customer may place an order for manufacturing a product through the web portal, which creates a production order in an ERP subsystem 102. Examples of the ERP subsystem 102 may include an ERP application or real-time enterprise resource management suites. For example, the ERP subsystem 102 may include SAP™ S/4HANA based on SAP™ NetWeaver 7.51 application server ABAP incl. 1610 FPS00 and/or SAP™ NetWeaver 7.50 application server JAVA with installed SAP™ Manufacturing. The ERP subsystem 102 may be on the cloud. In an example, a user may access the system 100 via the customer portal 101 brought up on an end user device, e.g., laptop, smartphone, desktop, workstation, etc. Product configuration and orders may be placed via the customer portal 101.

A demand planning and production order process along with respective production execution steps are determined automatically in the ERP subsystem 102, and the production order is distributed to an MES subsystem 103, for example, through an integration subsystem 104. The MES subsystem 103 may in turn communicate with on-premise manufacturing subsystems through another integration subsystem 105, which may include a gateway to the cloud. An example of the integration subsystem 105 may include SAP™ Manufacturing Integration and Intelligence (SAP™ MII). The software can leverage the Industrial Internet of Things (IIoT) by connecting equipment to supply chain software. Also, SAP™ Plant Connectivity may be used to connect machines to enterprise subsystems and the Industrial Internet of Things (IIoT). The software uses open platform communication (OPC) standards to transmit and enrich machine data across the manufacturing landscape.

An on-site shop floor person may access the production order through the MES subsystem 103 which is connected to shop floor machines via an OPC and a supervisory control and data acquisition (SCADA) subsystem 106. The shop floor machine may include Programmable Logic Controller (PLC) 107 or may be connected to PLC 107. PLC 107 may include an industrial digital computer which has been ruggedized and adapted for the control of manufacturing processes and manufacturing machines which may be located on the shop floor. The MES subsystem 103 may connect, monitor, and control manufacturing operations via PLC 107. Also, the MES subsystem 103 may integrate business and manufacturing processes to facilitate efficient, high quality production on the shop floor, and access real-time information, improve reliability, and take advantage of product traceability.

The OPC/SCADA 106 may operate as a control subsystem that uses computers, networked data communications and graphical user interfaces for high-level process supervisory management. A shop floor person may execute the steps of the production order through the MES subsystem 103, which then sends the data to an OPC server of the OPC and SCADA subsystem 106, which in-turn instructs the machines to perform a manufacturing activity to build the product according to the production order. The OPC server may implement OPC Unified Architecture (OPC UA) which is a machine-to-machine communication protocol for industrial automation developed by the OPC Foundation. OPC UA is a communication technology built specifically to live in that "no man's land" where data must traverse firewalls, specialized platforms and security barriers to arrive at a place where that data can be turned into information. OPC UA is designed to connect databases, analytic tools, Enterprise Resource Planning (ERP) subsystems and other enterprise subsystems with real-world data from low-end controllers, sensors, actuators and monitoring devices that interact with real processes that control and generate real-world data. OPC UA uses scalable platforms, multiple security models, multiple transport layers and a sophisticated information model to allow the smallest dedicated controller to freely interact with complex, high-end server applications. OPC UA can communicate anything from simple downtime status to massive amounts of highly complex plant-wide information.

Once the production line is completed, the finished product is sent to warehouse for delivery. Data is sent back to ERP subsystem 102 which will complete the production flow and starts the logistics and invoicing process. The end-to-end manufacturing insights can be monitored digitally with the details from the ERP subsystem 102, the MES subsystem 103 and the IIoT sensors from the shop floor. The IIoT sensors along with machine learning functions keeps track of machine health and can raise a flag for maintenance as and when required. As time goes by, the machine learning learns through its decision-making algorithm and predictive analysis to even specify the steps to perform along with the required tools for the maintenance person to perform the fix. With the help of AR or virtual reality (VR), the maintenance person can view a 3-D model of the machine to be overhauled or fixed along with the relevant actions to be performed through an electronic device, which may be portable. This provides a variety of benefits, including: less human interference; deep insight tracking details of end-to-end process with pre-defined KPIs; real-time status tracking support for decision making; supports real-time production process execution; Web UI; customer product configuration; order placement; and product description.

With Industry X.0 moving into real-time data, ease of placing an order for a product without any time or geographical constraints is becoming an important aspect of customer service that is implemented through the system 100. A customer portal 101 can be hosted in the cloud which can be accessed from desktops and smartphones. The customer authenticates himself to enter the portal 101. Once in, the list of components which he/she can choose to build a product is shown. The customer can drag the components to the center of the screen which is also called as configuration section on the portal. By choosing the different components the customer is shown with the corresponding final product on the right-end side. This section also gives a description and a sample picture of the final product. Upon choosing the final product based on the components, the customer can place an order along with a required quantity.

The system 100 integrates with the ERP subsystem 102, and can provide production order creation, planning process and scheduling, and production order distribution to the MES subsystem 103. The ERP subsystem 102 may be hosted on the cloud and can be accessed from anywhere across the globe. For example, once an order is placed through the customer portal 101, the ERP subsystem 102 may control the pricing, product demand, costing and logistics flow along with the agreed upon terms with the customer. Automated jobs take care of planning and a required order is created which is then converted to a production order. The production order is distributed to the MES subsystem 103 where the shop floor operations are performed. In an example, all the activities in the ERP subsystem 102, from production order creation to production order distribution to MES subsystem 103, may be automated. This helps to remove the ambiguity of human errors if the production order is being placed manually by a person.

The MES subsystem 103 may integrate to the shop floor through OPC, and provides production line execution control, execution status back to ERP, logistics details on near field communication (NFC) chips, and a shop floor execution monitoring tool. The MES subsystem 103 may be hosted on the cloud and can be accessed with the required credentials/fire-wall. The shop floor may have a production line that is executed without any physical presence except for maintenance. The shop floor person executes each process right from the MES subsystem 103, where the relevant parameters of the machines are implemented and monitored, like duration of the process, temperature if there is a heating activity and so on. Once an operation step is completed on the shop floor, an acknowledgement is sent back to the MES subsystem 103 via OPC. The MES subsystem 103 sends the data back to the ERP subsystem 102 for the production order step confirmation.

A production line monitoring tool 111 is built and hosted on the cloud, which shows the real-time production line in a graphical representation, e.g., via customer portal 101. The tool 111 may replicate the production line with a high precision of the position of the final product in the conveyor. With this approach, live data is provided across the manufacturing landscape, which then helps to feed a digital manufacturing tool with the real-time data to analyze the metrics on pre-defined KPIs. The final product is ready and is sent to warehouse for delivery. An NFC chip attached to the product or packaging may store the customer order details as delivery address, special instructions for transport and so on. The logistics partner can scan the NFC for the details and the product can be delivered to the customer's address.

A digital manufacturing tool 112 may include pre-defined KPIs, and provide harmonization of metrics across the manufacturing landscape, and provide alerts and performance improvement. The digital manufacturing tool 112 provides governance on the enterprise level. With measured data from IIoT sensors, the ERP subsystem 102 and the MES subsystem 103, the digital manufacturing tool 112 can define KPIs and can be used to analyze metrics and perform actions based on the metric analysis. The tool 112 may have access to real-time data across the manufacturing landscape to perform its operations. The tool 112 may be hosted on a cloud which brings the on-premise IIoT data of the shop floor to the cloud. The KPIs help to keep track of the quality control, machines availability in times of planned/emergency shutdowns and pushing the orders to other plants, pattern recognition of metrics, root cause analysis in case of incidents, and machine utilization metrics. With this analysis, it helps to increase the overall performance of the manufacturing process and alert the respective authority if a KPI breaches a threshold value.

The system 100 also includes empirical analysis subsystem 120. The empirical analysis subsystem 120 can extract empirical text and video from various social media feeds. For example, the social media feeds may include product reviews of a product, which may have been manufactured using the system 100. The empirical analysis subsystem 120 can connect to social media applications to retrieve social media feeds. Natural language processing may be used to extract relevant data from the social media feeds and machine learning may be used to determine insights about the product from the extracted data and to determine redesign recommendations that can be fed back to the system 100 for remanufacturing.

Figure 2:
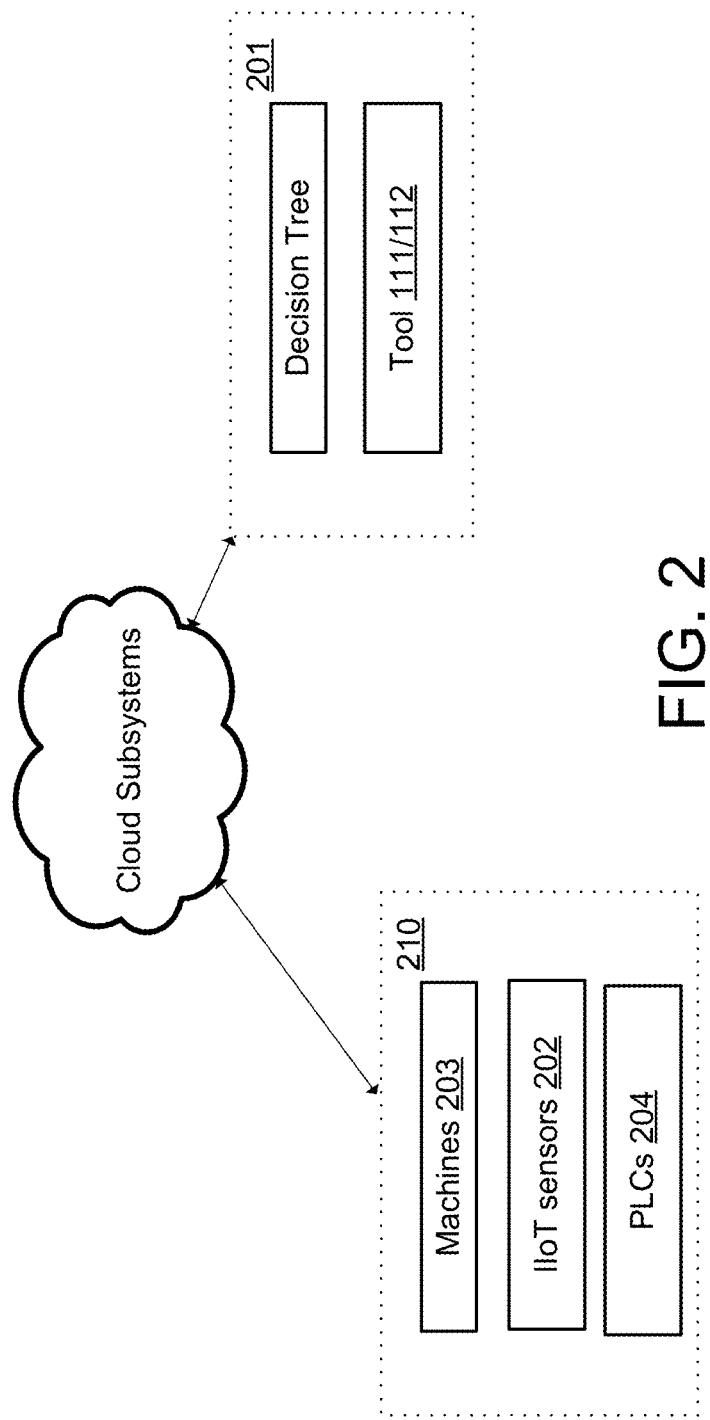
FIG. 2 shows an example of components which may be part of a machine learning subsystem.

The system 100 may include artificial intelligence (AI) components in the ML subsystem 110 that employ ML, predictive maintenance, AR/VR, decision trees, and regression analysis. Also, Cognitive Robotics Process Automation (CRPA) may be used to automate repetitive tasks and perform other operations. FIG. 2 shows an example of AI components at 201, which may be part of the ML subsystem 110. For example, based on the data collected from sensors from machines on the shop floor, a machine learning algorithm can predict machine failure and invoke preventive maintenance. The components in 201 are shown connected to other cloud subsystems but the components in 201, which may be part of the ML subsystem 110, may also be on the cloud, such as shown in FIG. 1. At 201, a decision tree algorithm may be used as a decision support tool to exploit the data and make the final verdict for predictive maintenance decisions. The AI decisions may be based on current and historic sensor data. Also, decision tree rules may be inferred by factsheet values of each machine to validate the behavior and support and continual monitoring to avoid stoppage of operational activities. Also, the AI components may execute trend analysis over a collection of historical data. The analysis is performed to derive efficiency and performance of each machine on floor and the quality of products produced by the machines. Alert notifications may be generated for machines which are under/over utilized, idle state or nearing breakdown. Tool 111 and/or tool 112 shown in FIG. 1 may receive predictions regarding the health of shop floor manufacturing machines and send alerts if needed to appropriate shop personal to perform preventive maintenance. Also, operational behavior of shop floor manufacturing machines 203 may be controlled to prevent failures and product manufacturing delays. In an example, a shop floor 210 may include PLCs 204, IIoT sensors 202 sensing attributes of shop floor manufacturing machines 203, e.g., pressure sensors, heat sensors, temperature sensors, vibration sensors, etc., and the shop floor manufacturing machines 203. PLCs 204 may include PLC 107 shown in FIG. 1. Sensor data may be transmitted to the subsystems shown in FIG. 1 which may be on the cloud. The sensor data may be stored on the cloud. Also, fact sheets for the shop floor manufacturing machines 203 may be stored on the cloud. The fact sheets may include desired maintenance intervals, temperature tolerances, etc. Also, history of operation of the shop floor manufacturing machines 203 may be stored on the cloud. The decision tree algorithm may generate predictions for potential failure of the shop floor manufacturing machines 203, and the shop floor manufacturing machines 203 are controlled and/or fixed to prevent failure.

The system 100 may track products as they proceed through the manufacturing process. In an example, NFC may be used to track the status of products being manufactured. For example, an NFC tag or chip may be attached to material on the production line to trace the material as it passes through each station defined for execution. As the product passes through a defined station, NFC sensors captures it and updates the backend ERP subsystem 102 to provide real-time status of an order. On completion, the delivery team uses the NFC chip to retrieve the details of address for shipment.

Figure 3:
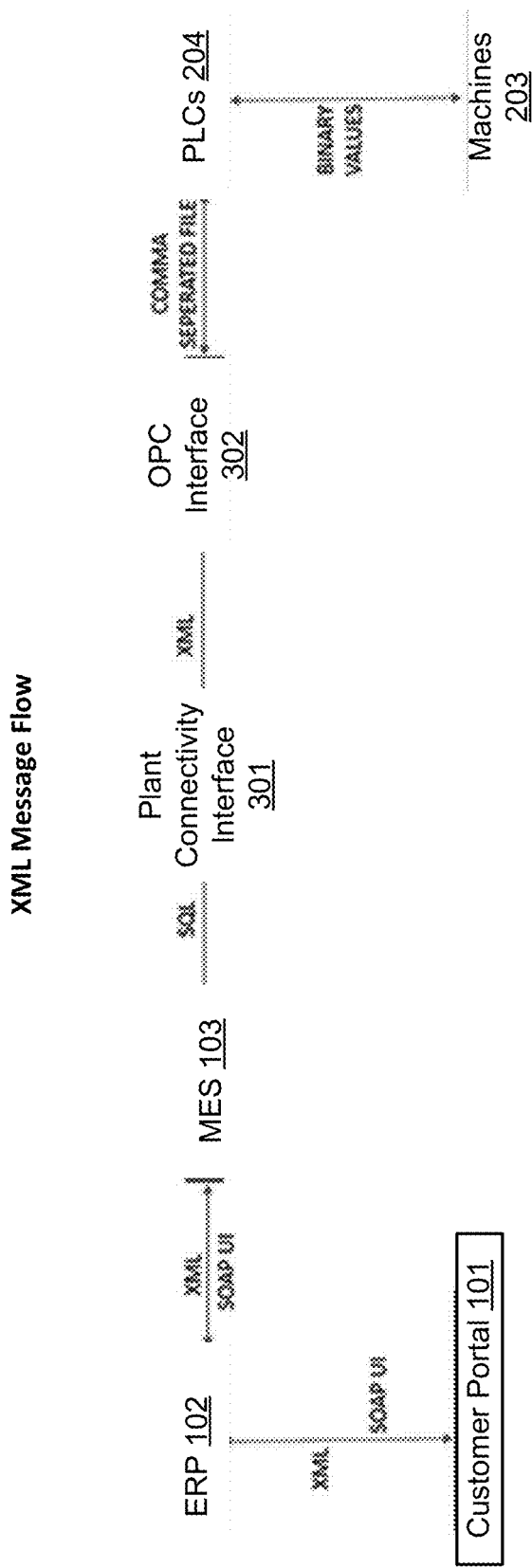
FIG. 3 shows an example of message flow protocols for messaging between components of the digital manufacturing system.

FIG. 3 shows an example of message flow protocols for messaging between components of the system 100. For example, Extensible Markup Language (XML) and/or SOAP (originally Simple Object Access Protocol), which is a protocol specification for exchanging structured information in the implementation of web services in computer networks, may be used to communicate messages between the customer portal 101 and the backend (e.g., ERP and MES subsystems 102 and 103), which may be on the cloud. Also, the ERP and MES subsystems 102 and 103 may communicate via XML and SOAP.

A data connectivity layer may include a plant connectivity interface 401 and an OPC interface 402. An example of the plant connectivity interface 401 may be PCo by SAP™. The plant connectivity interface 401 may include a software component that enables the exchange of data between the MES subsystem 103 and industry-specific standard data sources (e.g., OPC sources) of different manufacturers, for example, process control subsystems, plant historian subsystems, etc. With the plant connectivity interface 401, the system 100 can receive tags and events from the connected source subsystems in production either automatically or upon request and forward them to the connected MES or ERP subsystems 102 or 103. Also, SQL may be used to query specific source subsystem tags from a destination subsystem, such as the MES subsystem 103.

FIG. 3 also shows a data format (e.g., delimited file) for information exchanged between the PLCs 204 and OPC sources. Also shown is that the PLCs 204 may exchange data with machines 203 in binary (e.g., digital data).

Figure 4:
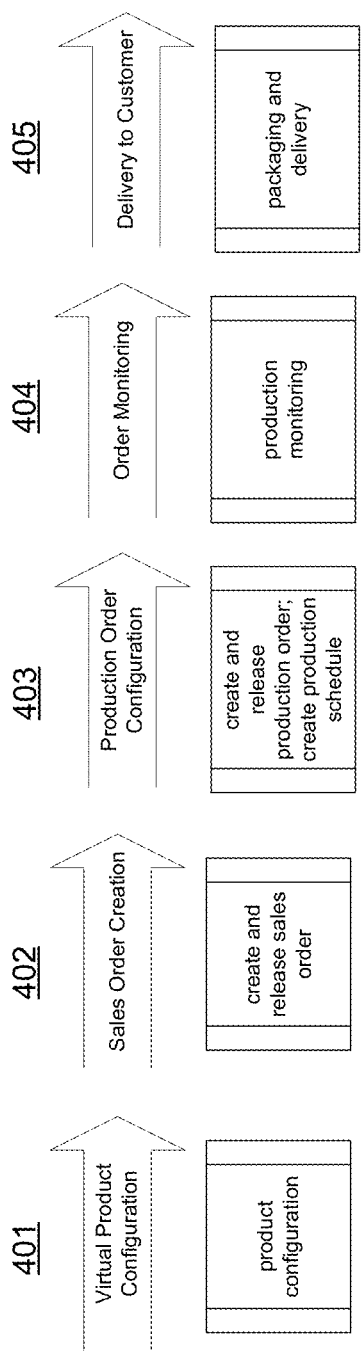
FIG. 4 shows an example of an order and production flow that may be performed in the digital manufacturing system.

FIG. 4 shows an example of an order and production flow that may be performed in the system 100. At 401, product configuration details are provided to the system 100 for example via the customer portal 101. At 402 a sales order may be created and released for the product to be manufactured. At 403, a production order is created and released. For example, once the production order is placed, the production order is translated with the help of the bill of material into a production request through the ERP subsystem 102. The production request is used to make a production schedule at 403. The components for the product are either manufactured or purchased from vendors. After the goods receipt, production planning is done for the production order and the production operation is started on the shop floor. At 404, the production is monitored. At 405, the product is packaged and delivered. In Make-to-Order production, the ERP subsystem 102 supports the inventory manager and the purchasing department, to ensure an uninterrupted flow of components and to keep stocks as low as possible. This flow provides several benefits. A customer can configure the product for his requirements. An end-to-end production flow can be traceable by the customer, and the customer can if the process is delayed or on-track.

Figure 5:
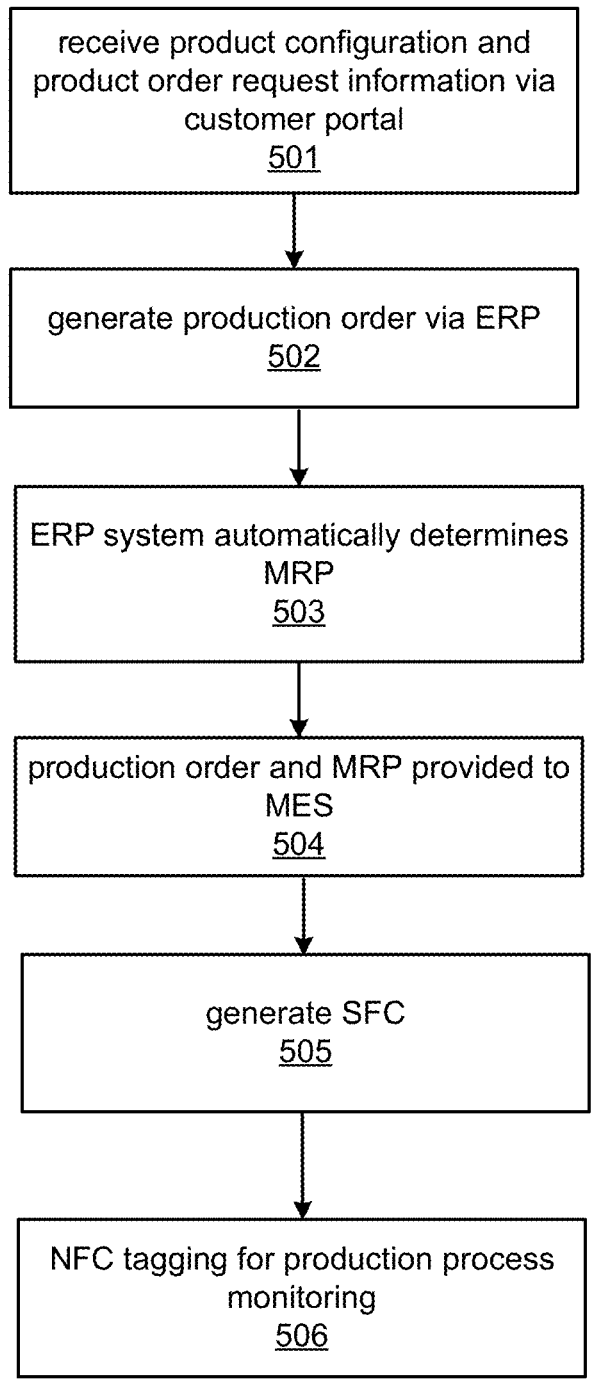
FIG. 5 shows an example of a process flow that may be performed by the digital manufacturing system.

FIG. 5 shows an example of a process flow that may be performed by the system 100. For example, at 501, the system 100 receives product configuration and production order request information via the customer portal 101. At 502, a production order is generated via the ERP subsystem 102. At 503, the ERP subsystem 102 automatically determines a manufacturing requirement plan (MRP) and production order for manufacturing the product. At 504, the production order and MRP are provided from the ERP subsystem 102 to the MES subsystem 103. The production order may include information from the MRP. At 505, the MES subsystem 103 generates a unique identifier (e.g., a shop floor control identifier (SFC)) which may be transmitted to the shop floor. At 506, NFC tagging is performed to track the production process, and to transmit event notifications of the manufacturing process to the backend subsystems and the user during production. The manufactured product may be delivered to the user and the user is provided with real-time product shipment information. Also, after production, the production standard may be analyzed using digital management insight software.

Figure 6:
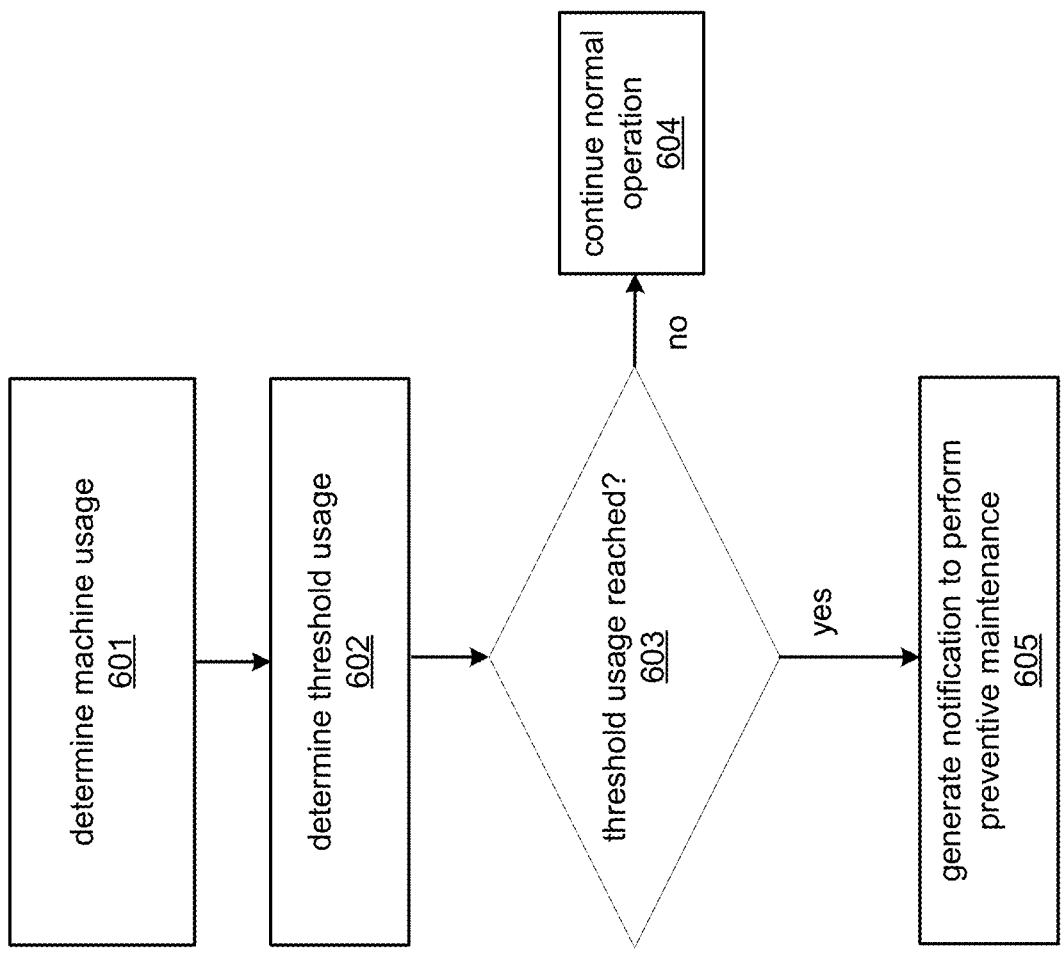
FIG. 6 shows an example of a process for preventive maintenance based on trend analysis.

FIG. 6 shows an example of an AI process for preventive maintenance based on trend analysis, which may be performed by the ML subsystem 110. At 601, machine usage is determined for a machine of the machines 203. The machine usage may include information associated with actual usage of the machine. At 602, a threshold usage is determined. A threshold usage may be an amount of time the machine can be used before failure and may be based on past history of the machine or other similar machines. The threshold usage may be a prediction made by an AI component. Historical data may be analyzed to determine trends and identify thresholds for usage based on the trends. At 603, a determination is made as to whether the machine has reached its threshold usage. If no, the machine is allowed to continue its normal operation at 604. If yes, a notification may be generated to a service person to perform preventative maintenance at 605.

Figure 7:
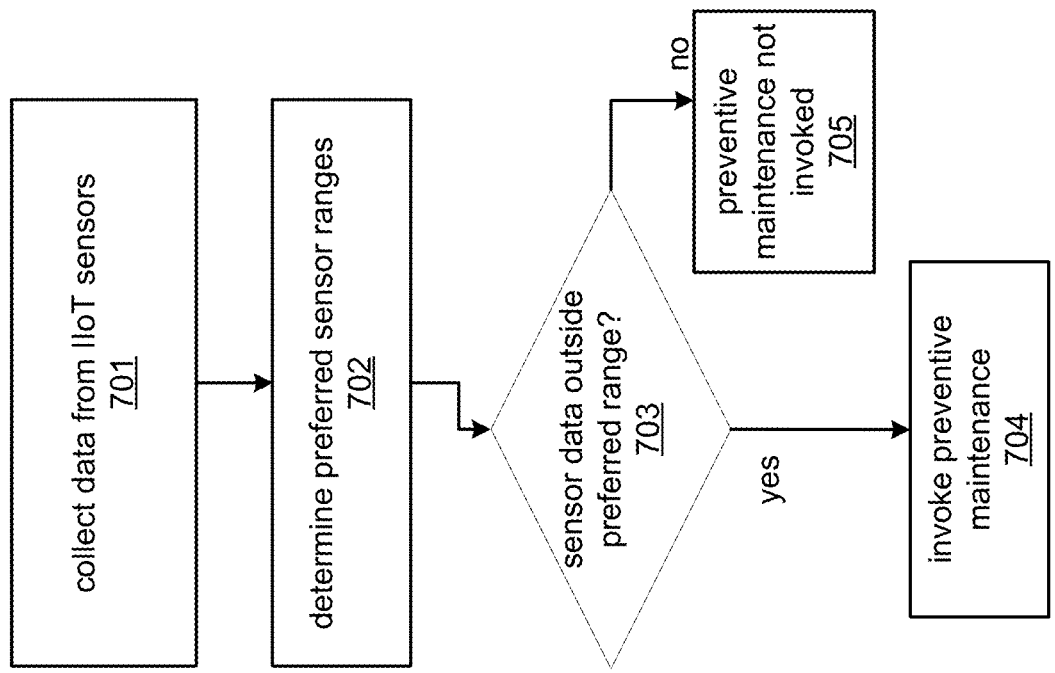
FIG. 7 shows an example of a process for preventive maintenance based on a decision tree and/or a regression algorithm.

FIG. 7 shows an example of an AI process for preventive maintenance based on a decision tree and/or a regression algorithm, which may be performed by the ML subsystem 110. At 701, real-time data is collected from IIoT sensors 202 and stored on the cloud. At 702, the preferred sensor ranges may be determined by the decision tree and regression algorithm. At 703, sensor data is compared to preferred machine ranges to determine whether a sensor value is outside preferred range. The ML subsystem 110 may analyze sensor data for machine usage to determine whether to invoke preventative maintenance, such as if a sensor value is outside the range. If a sensor value is out of a preferred range, then preventative maintenance is invoked at 704. For example, AR and/or VR may be made available to service personnel through the system 100 to perform machine maintenance. Also, operational behavior of the machine may be controlled to allow the sensor data to fall within the preferred range. At 705, if the sensor values are within preferred ranges, then preventative maintenance is not invoked.

Figure 8:
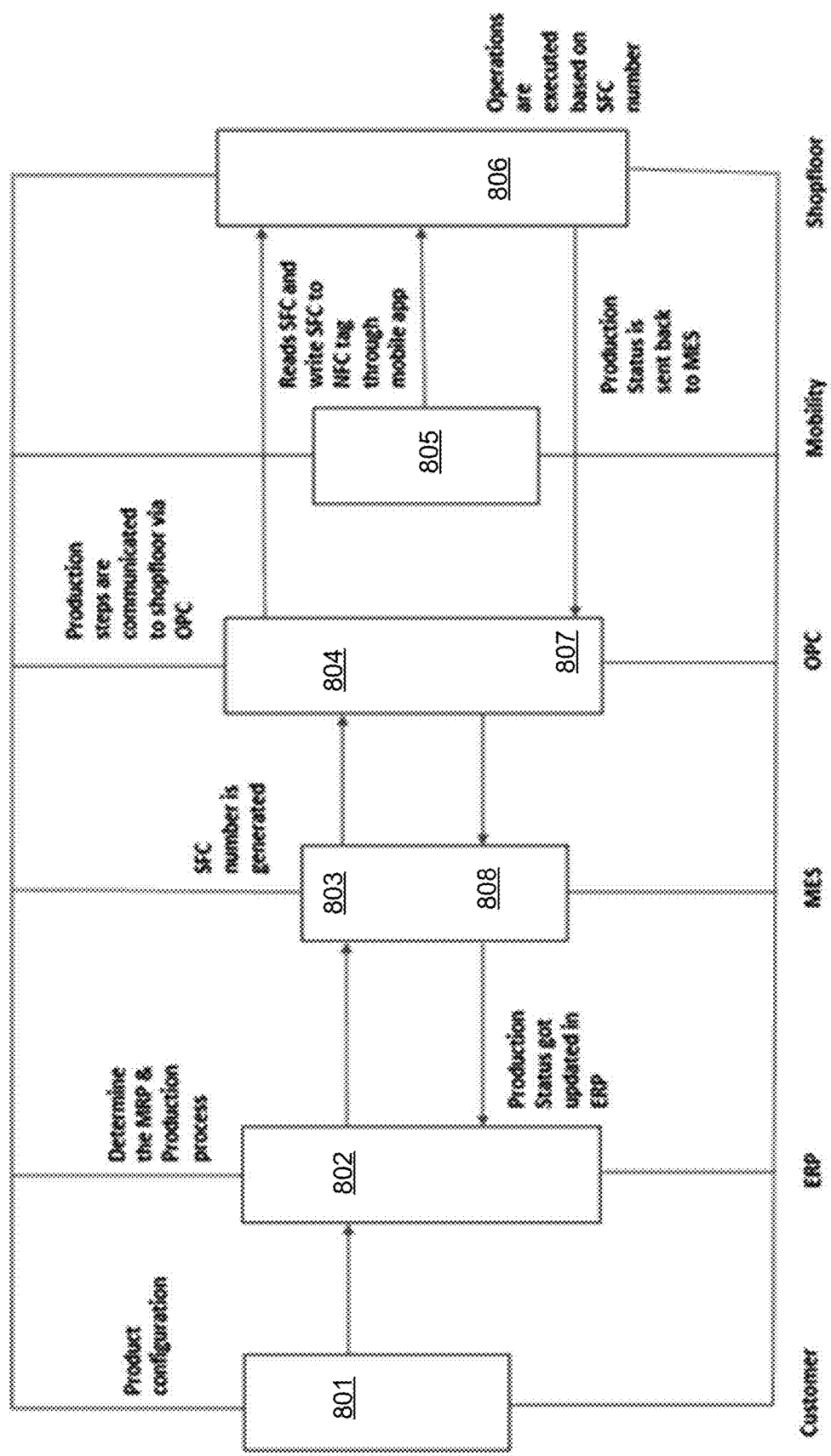
FIG. 8 shows an example of data flow diagram for connected manufacturing that may be performed by the digital manufacturing system.

FIG. 8 shows an example of data flow diagram for connected manufacturing that may be performed by the system 100. The customer/user can configure the product in the customer portal 101 based on his/her requirements at

801. Once the production order is placed, the ERP subsystem 102 determines the MRP and production steps which will be distributed to the MES subsystem 103 at 802. For example, once the production order is created via the customer portal 101 and the ERP subsystem 102, the ERP subsystem 102 uses the data for the production order to automatically determine the MRP and production process. For example, attributes for the production order, such as quantity, dates, production order information and scheduling information are used to create the MRP and production process. The MRP and production process may be transmitted to the MES subsystem 103. The messaging format and protocol may include SQL between the ERP and MES subsystems.

The SFC identifier number gets generated in the MES subsystem 103 at 803. For example, the SFC number is created for the production order in the MES subsystem 103. A precondition is that the production order is distributed to the MES subsystem 103. Then, once the production order is distributed to the MES subsystem 103, the production process and MRP for the production order is saved and the SFC number gets generated in the MES subsystem 103. The MES subsystem 103 communicates the SFC identifier and production order to the shop floor through an OPC subsystem at 804. The SFC identifier is stored in an NFC chip for example through a mobile application at 805, and the NFC chip is attached to the product during the production process for tracking. In an example, a mobile application for tagging the SFC identifier to an NFC tag may be executed on a mobile device by a shop floor person. The SFC identifier is provided to the mobile application from the MES subsystem 103, and the mobile application writes the SFC identifier to the NFC tag. A precondition may include that the SFC number should be generated for the production order in the MES subsystem. The post condition is that SFC number is written in the NFC tag through the mobile application.

The corresponding production operations are executed by shop floor machines according to the production order at 806, and the SFC identifier is used to track the operations. Production status associated with the SFC identifier is sent to the MES via the OPC at 807. At 808, the MES subsystem 103 sends production updates to the ERP subsystem 102. The ERP subsystem 102 stores the production updates and makes them available via the customer portal 101. In an example associated with production tracking, here the relevant parameters of the machines like duration of the process, temperature if there is a heating activity and so on are entered or otherwise determined directly from sensors. Once an operation step is completed on the shop floor, an acknowledgement is sent back to MES subsystem 103 via OPC. The MES subsystem 103 sends the data back to ERP subsystem 102 for the order step confirmation. The shop floor person should be accessible to MES subsystem 103 through OPC/PLC setup, and then based on the SFC identifier, the operations are executed in shop floor.

Production operations are executed on the shop floor based on the SFC identifier on the NFC tag. Once an operation is completed on the shop floor, the status is updated in the MES subsystem 103 through OPC/PLC which is then updated in ERP subsystem 102. Production operations are executed on the shop floor and tracked according to the SFC identifier. For every operation completed in shop floor, the status is updated in MES subsystem 103. Also, once the product is finished, the product may be moved to warehouse from where it will be dispatched to the customer. Also, the details of the product can be viewed by the customer in the customer portal 101, such as shipping status, shipping dates, quantity, order number, etc. Also, during and after production, the customer can view the production, gain manufacturing insights, and analyze though KPI analytics. The customer may have to log into the system 100 to view the insights.

Through the customer portal 101, a user or customer may sign up. A profile may be created for the customer. Then, the customer may login through the customer portal 101, enter a password to be authenticated, and use the subsystem to create a product and a production order to create the product. The customer enters details for the product creation and the production order, and these details are sent to the ERP subsystem 102. The messaging format and protocol between the customer portal 101 and the ERP subsystem 102 may include XML/SOAP UI.

The system 100 may execute a data flow for authentication of a user for the MES subsystem 103. For example, a shop floor person may login to the MES subsystem 103 to facilitate generation of an SFC identifier for the product and to enable communication with machines on the shop floor.

Figure 9D:
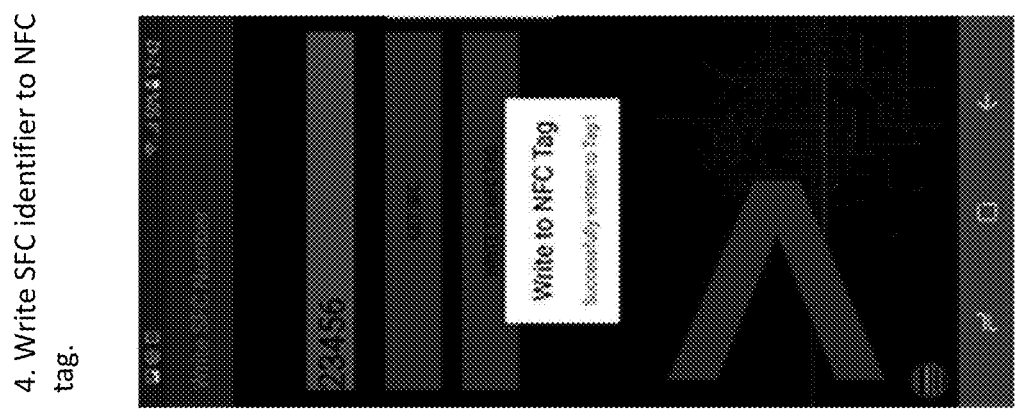
FIGS. 9a-g show examples of screen shots in a mobile application for writing an identifier to a tag and reading the identifier, which is used for tracking during the manufacturing process.
Figure 9C:
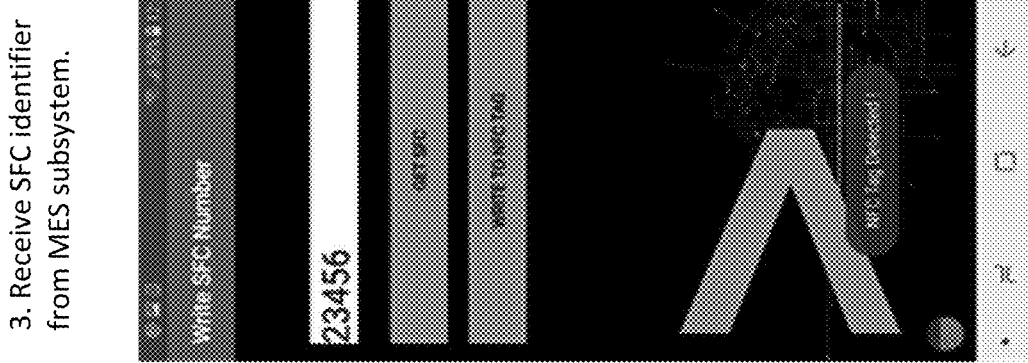
Figure 9B:
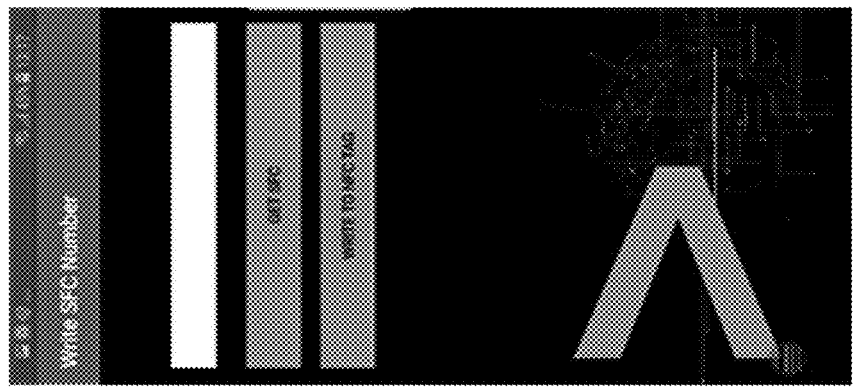
Figure 9A:
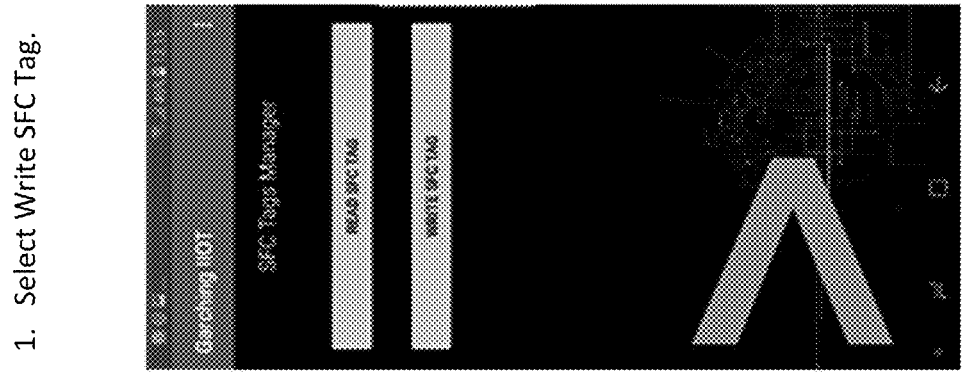
Figure 9G:
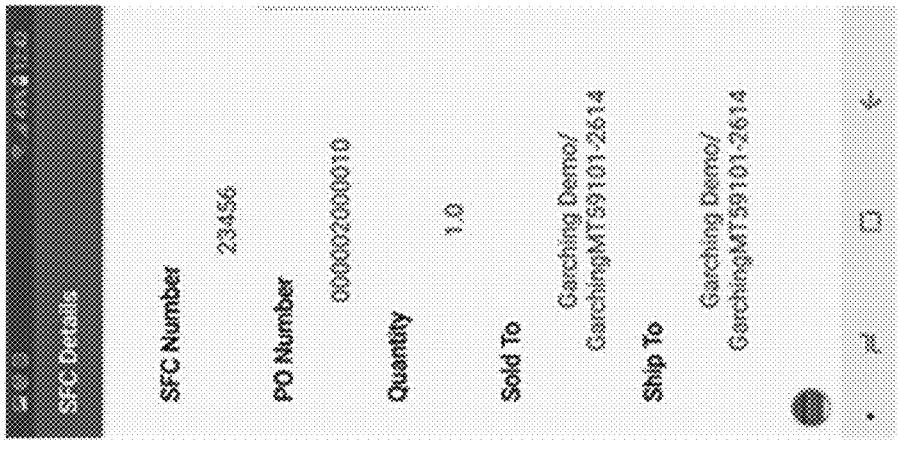
Figure 9F:
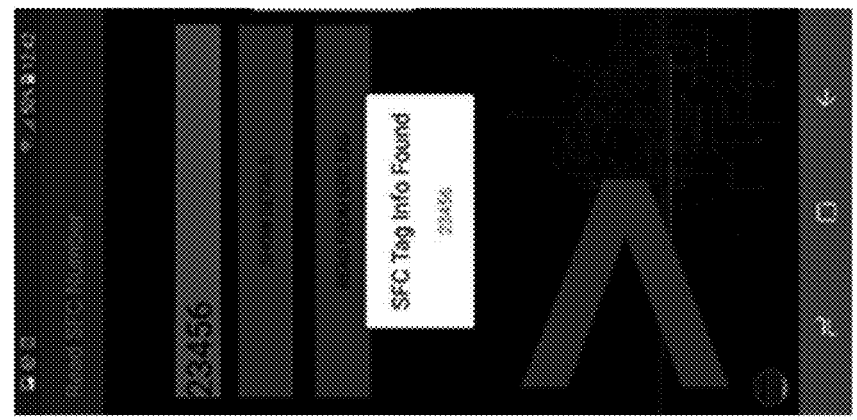
Figure 9E:
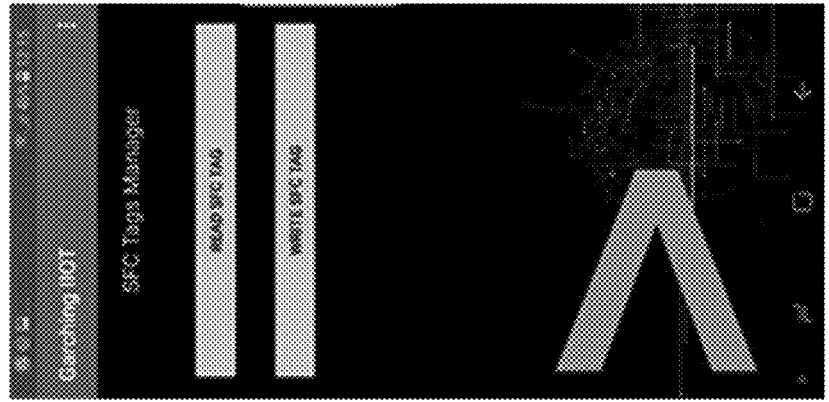

FIGS. 9*a-g* show examples of screen shots in a mobile application for writing an SFC identifier to an NFC tag and reading the SFC identifier, which is used for tracking during the manufacturing process. The mobile application may be executed by a processor of the mobile device. FIG. 9*a* shows a screenshot including buttons for reading or writing to an NFC tag. For example, a WRITE SFC TAG button may be selected to write an SFC identifier to an NFC tag. FIG. 9*b* shows that a GET SFC tag button may be selected to read an SFC identifier for example from the MES subsystem 103 or it may be entered manually. FIG. 9*c* shows the SFC identifier that is automatically read or manually entered. FIG. 9*d* shows the mobile application writing the SFC identifier to the NFC tag after the WRITE SFC TAG is selected. FIG. 9*e* shows that a READ SFC TAG button may be selected to read the SFC identifier from the NFC tag after it is written. FIG. 9*f* shows a confirmation message that a SFC identifier is found in the NFC tag. FIG. 9*g* shows details associated with the SFC identifier.

Figure 10:
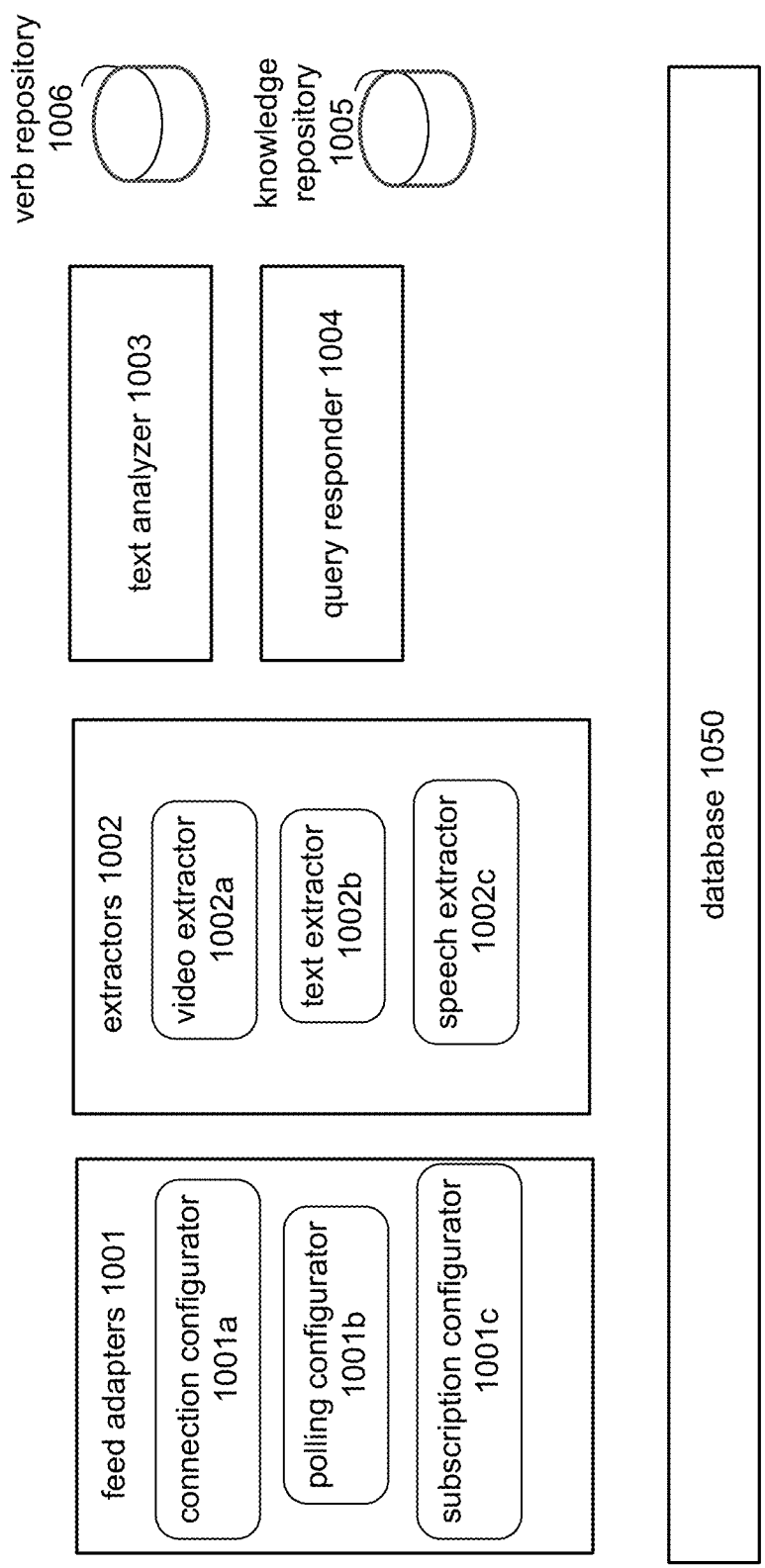
FIG. 10 shows an example of an empirical analysis subsystem.

FIG. 10 shows an example of the empirical analysis subsystem 120. As was discussed above, the empirical analysis subsystem 120 can extract text and video from various social media feeds. For example, the social media feeds may include product reviews of a product, which may have been created using the system 100. Natural language processing may be used to extract relevant data from the social media feeds and machine learning may be used to determine insights about the product from the extracted data and to determine redesign recommendations that can be fed back to the system 100 for remanufacturing. Components of the empirical analysis subsystem 120 are further discussed below.

There are a number of technical challenges to extracting and analyzing relevant product data, which may be obtained from the Internet. For example, after products are released into the market, the products may be reviewed through various mediums, such as through text and video. The empirical analysis subsystem 120 is a single platform that can extract empirical data for the products from multiple different mediums. Furthermore, product reviews or comments may be created by users in multiple different social media applications. Extracting data is different for each social media application. The empirical analysis subsystem 120 is designed to extract data from multiple different social media applications even though the extraction mechanisms may be different for each social media application. Furthermore, many product reviews are released as videos against which an extraction mechanism is not available. The empirical analysis subsystem 120 includes an extraction mechanism to extract relevant data from video.

Generally, the empirical analysis subsystem 120 is a common platform for extracting empirical text and video from social media applications. For video reviews, transcripts are generated through a combination of natural language processing and machine learning, and for text reviews, data is cleansed and diced to extract the relevant data. Also, segregation of structured and unstructured data may be performed and data science techniques may be applied for generating insights on a product from a customer's perspective. The insights may be used in the ERP system 102 for product reengineering and redesign.

Components of the empirical analysis subsystem 120 are shown in FIG. 10, and the components may be comprised of machine readable instructions stored on a non-transitory computer readable medium and executed by at least one processor. The empirical analysis subsystem 120 may include feed adapters 1001 that integrate with social media applications for retrieval and post of feeds. The feed adapters 1001 may each include one or more of a connection configurator 1001a, a polling configurator 1001b and a subscription configurator 1001c to connect to social media applications, such as Facebook™, Youtube™, Twitter™, etc. The connection configurator 1001a contains metadata and configuration information for a social media application. A generic user-id may be created for each social media application and is part of the metadata and configuration information used by the connection configurator 1001a. The polling configurator 1001b contains polling information and frequency for connecting to a social media application to fetch the information subscribed to a keyword or hashtag. The subscription configurator 1001c may create a feed with a predetermined keyword or hashtag, and the feed is retrieved from the social media application through the created connection with the social media application. Establishing a connection every time can costly in terms of time and message exchanges. In an example, the connection configuration 1001a establishes a connection with a social media application, and maintains the connection so the connection does not need to be re-established each time data is to be retrieved from the social media application.

In an example, steps performed by each of the feed adapters 1001 may include create a user ID for a social media application; create a feed based on at least one keyword, which may be a hashtag; link the user ID to the feed; and subscribe to the feed linked to the user ID. Updates to the subscribed feed are retrieved, for example, at designated intervals or when new data is available for the feed by the feed adapter. A feed, also referred to as a social media feed if coming from a social media application, may include any content related to one or more keywords. The feed may be frequently updated such as to include new posts having the one or more keywords. In an example, a product may be a particular model of a vehicle, and keywords may be attributes of the product, such as rear legroom, acceleration, style, looks, rims, vehicle model name, etc. The product attributes may also be the subjects of comments in social media feeds retrieved by the feed adapters 1001. The subjects may be determined according to natural language processing described below. The content with those keywords forms a feed from the social media application and may be retrieved by the feed adapter. A user ID may be used to login to the social media application and create a connection with the social media application and to subscribe to a feed. Also, one or more feeds may be retrieved from a social media application under the user ID and stored in a data warehouse or database 1050 connected to the empirical analysis subsystem 120 with the user ID information. The database may be on the cloud along with the empirical analysis subsystem 120.

The data from the feeds gets extracted by extractors 1002. The extractors 1002 may include video extractor 1002a, text extractor 1002b, and speech extractor 1002c. For text data extracted from a feed, the text gets cleansed by the text extractor 1002b, and is stored in the database 1050 for further analysis to obtain Ci and Si values, which are described below. With regard to video, the video extractor 1002a splits the audio part from the visual part of the video, and the audio part is converted from speech to text to get a transcription. The transcription text is then cleansed for further analysis.

The text, which may be extracted from text feeds or video feeds by the extractors 1002, is analyzed by text analyzer 1003, which employs natural language processing. For example, text extracted from a feed that is captured from a social media application or its corresponding website is fed into a tokenizer to separate the text into words. The words are then identified as parts of speech, such as subject, verb, adjective, etc. Identified verbs are verified using a verb repository 1006 containing a list of known verbs. Once confirmed, the positions of the verbs are determined. Based on a position of a verb in a sentence, a determination is made as to whether the sentence is a question or not a question. If the sentence is a question, a query responder 1004 may retrieve an answer to the question from a knowledge repository 1005. The knowledge repository 1005 may contain questions and corresponding answers. In an example, regular expression matching may be performed with the question on the knowledge repository 1005 to determine whether there are any matches to the question in the knowledge repository 1005. If so, the query responder 1004 retrieves the corresponding answer from the knowledge repository 1005, and the answer is posted to the feed in the social media application by a feed adapter for the social media application. If no answer is identified, then a notification may be generated to an applicable user of the system 100 to post an answer to the feed. If a sentence is determined not to be a question, then the text analyzer 1003 determines a component index and satisfaction index for the sentence, which is used to determine insights for the product through machine learning. The component index and satisfaction index may be used to determine the sentiment of the users posting comments or reviews on the product. If the sentiment is determined to be negative, then product redesigning may be invoked in the ERP subsystem 102 based on the subject matter of the reviews and posts. In an example, sentiment may be determined for sentences not containing questions based on a calculated component index and satisfaction index for each of the sentences.

Figure 11:
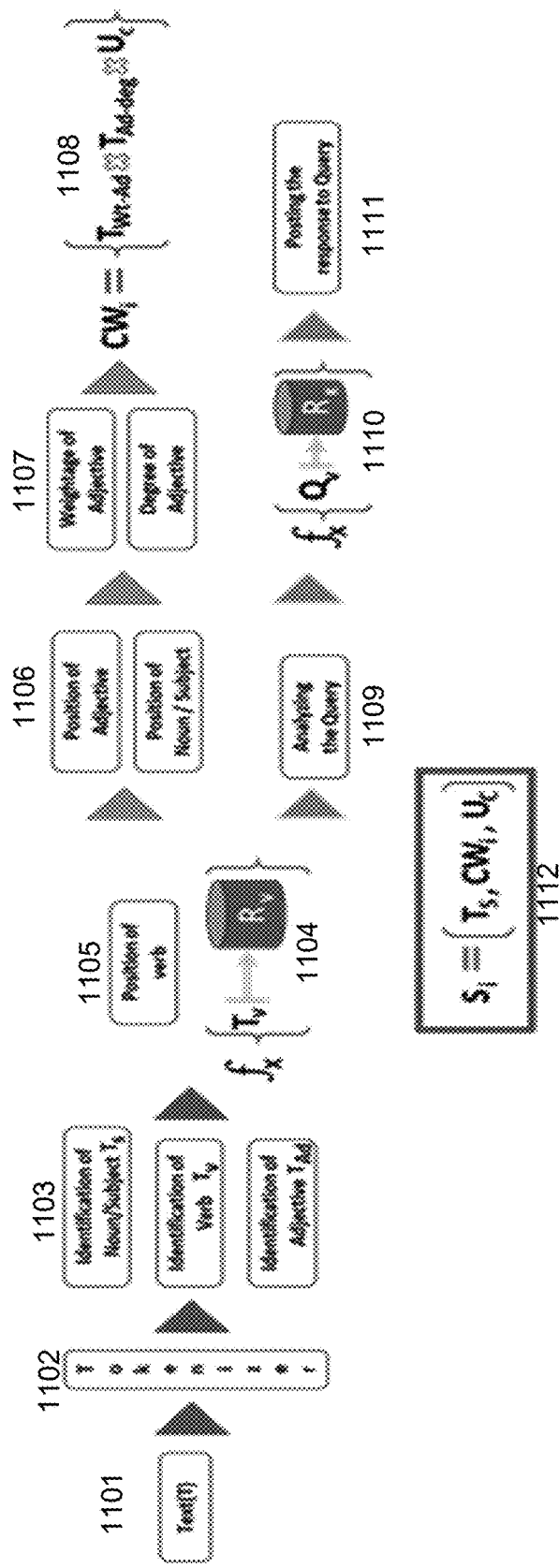
FIG. 11 shows an example of the natural language processing and component index and satisfaction index analysis that may be performed by a text analyzer.

FIG. 11 shows an example of the natural language processing and component index and satisfaction index analysis that may be performed by the text analyzer 1003. Text 1101 is text extracted from a feed. For example, the text 1101 is extracted from a comment or post from a social media post. The text 1101 is tokenized by tokenizer 1102. A sentence which is basically a sequence of strings is broken into pieces, such as words, keywords, phrases, symbols and other elements called tokens. Tokens can be individual words, phrases or even whole sentences. In the process of tokenization, some characters like punctuation marks are discarded.

The words from a sentence are then identified as the parts of a sentence, which is shown at 1103. There are eight parts of speech in the English language: noun, pronoun, verb, adjective, adverb, preposition, conjunction, and interjection. The part of speech indicates how the word functions in a meaning as well as grammatically within the sentence. At 1103, in particular, a Noun/Subject (Ts), Verb (Tv) and Adjective (Tad) are identified from a sentence. Multiple nouns, verbs and adjectives may be identified in the sentence. A subject of the sentence may be identified as one of the nouns. While the adjective helps in identifying the mood of the customer, the subject and verb identification helps in identifying the kind of sentence and hence the subject discussed. An identified verb may be verified using a verb repository, such as the verb repository 1006 shown in FIG. 10. In FIG. 11, identifying the verb using a verb repository, also referred to as verb terminology repository, is shown at 1104.

In a sentence, the verb usually goes just after the subject. A verb can be just one word or more than one word. While the actual action performed is denoted by the main verb, a second verb in the sentence, referred to as an auxiliary verb, may denote the tense of a sentence. The text analyzer 1003 uses the position of the verb, shown as 1105, to identify a sentence as a question. If a verb appears before the subject, then this is used as an additional means of identifying a question. This gains importance for social media feeds include posts, etc., that may not use punctuation or formal WH question words. The verb may be an auxiliary verb, and the position of the auxiliary verb is used to determine whether the sentence is a question. Other ways that may be used to identify a sentence as a question may be if the sentence uses a question mark or if the sentence contains WH question words, such as who, what, how, why, whose, etc. These ways may be used in conjunction with verb position to determine whether the sentence is a question.

When the sentence is identified as not a question, a sentiment is determined for the sentence. Sentiment refers to the attitude of the user with regard to the subject of a comment provided by the user in the sentence. In an example, the subject is an attribute of a product manufactured by the digital manufacturing system 100, and a user of the system 100 may try to determine sentiment of users of the product for improving the product, educating users on the product, etc.

In an example, an estimate of the sentiment of a comment in the sentence may be calculated based on an adjective in the sentence that is representative of the sentiment, and an estimate of a degree of intensity of the adjective, the degree of intensity of the adjective being a measure of an amount of positive or negative intent of the comment. For example, the position of the adjective and noun are determined, as shown at 1106. Also, weightage and degree of the adjective is determined, as shown at 1107.

The degree of intensity of an adjective captures the intensity of the comment and the actual sense of the adjective. The degree of intensity of the adjective may be a measure of an amount of positive or negative intent of the comment. The degree of intensity may be determined using words which show the extent to which a customer likes or dislikes the product. In terms of the actual intent, while the adjective bad may be negative, a phrase not bad at all or not at all bad is a positive phrase. Likewise, while good is a positive comment, the phrase good for nothing is a bad comment. The degree of intensity of an adjective identifies such words, and tags values to them to get the complete meaning of the adjective. In an example, the degree of intensity of an adjective may be determined as described in "Adjective Intensity and Sentiment Analysis" by Sharma et al., January 2015, Proceedings of the 2015 Conference on Empirical Methods in Natural Language Processing. The weightage of the adjective determines if the comment is a positive or a negative comment about the product. While a positive comment like good, nice, neat, awesome, etc., receives a positive weightage, a negative comment like bad, worst, etc., receives a negative weightage.

At 1108, the component weightage index is determined. The component weightage index is indicative of positive or negative sentiment of the subject, which may be the product. The positive and negative sentiments may be accumulated to determine the sentiment of the product. If the sentiment is negative, then notifications may be generated for the subject of the negative sentiment, and may be automatically sent to a product design component of the ERP subsystem 102. Then, the product may be redesigned to improve the sentiment.

The component weightage index is calculated a function of the weightage of the adjective, degree of intensity of the adjective, and the number of users having a comment in the social media feeds about the same subject as found in the sentence, as shown at 1108. The component weightage index provides the mood of the user of the product and the degree of intensity of an adjective provides the intent and the intensity of the user. The number of users provides the actual weightage to be provided to the comment since, it is the actual field which denotes the strength of a comment.

The satisfaction index, shown at 1112, is a function of the subject of the sentence, the component weightage index and the number of users having a comment about the same subject matter. In an example, the satisfaction index is comprised of multiple tuples of these values. A lookup may be performed on the satisfaction index based on a subject Ts, and then sentiment can be estimated for the subject according to the corresponding component weightage index and the number of users. Then, actions may be performed depending on whether the sentiment is positive or negative for the subject.

When the sentence is identified as a question, as shown at 1109, the sentence is analyzed as a query, such as by query responder 1004. The query responder 1004 may retrieve an answer to the question from a knowledge repository, such as knowledge repository 1005 shown in FIG. 10. This is shown at 1110. At 1111, the answer is posted to the feed as a response to the question.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. A digital manufacturing system, comprising:
   at least one processor executing machine readable instructions stored on at least one non-transitory computer readable medium;
   a web portal to receive product configuration information for a product;
   an enterprise resource planning subsystem to:
      generate a production order based on the product configuration information; and
      determine a manufacturing resource plan and production steps for manufacturing the product;
   a manufacturing execution subsystem to:

generate an identifier for the manufacturing resource plan; and communicate the manufacturing resource plan and the production steps to a production control subsystem controlling machines performing the manufacturing of the product according to the manufacturing resource plan and the production steps, the production control subsystem storing the identifier in a near field communication chip attachable to the product during the manufacturing to provide real-time tracking of the manufacturing throughout the steps; and an empirical analysis subsystem comprising:

feed adapters to each connect to a different social media application of a plurality of social media applications, and retrieve a social media feed from the respective social media application;

extractors to extract text related to the product from the social media feeds, the social media feeds including a text feed and a video feed;

a text analyzer to:

apply natural language processing to the extracted text, the natural language processing identifying a sentence from the extracted text containing a question and a sentence not containing a question;

for the sentence determined to contain a question, determine an answer to the question from a repository, and post the answer to at least one of the social media feeds; and for the sentence determined not to contain a question, determine a sentiment for the sentence.

2. The digital manufacturing system of claim 1, wherein to determine a sentiment for the sentence determined not to contain a question, the text analyzer is to:

calculate an estimate of the sentiment of a comment in the sentence based on an adjective in the sentence that is representative of the sentiment; and calculate an estimate of a degree of intensity of the adjective, the degree of intensity of the adjective being a measure of an amount of positive or negative intent of the comment.

3. The digital manufacturing system of claim 2, wherein to calculate an estimate of the sentiment of a comment in the sentence, the text analyzer is to:

calculate a component index of the sentence as a function of weightage of the adjective and the degree of the adjective, the weightage of the adjective based on a number of users having a comment in the social media feeds about a subject of the sentence.

4. The digital manufacturing system of claim 1, wherein to determine a sentiment for the sentence determined not to contain a question, the text analyzer is to:

determine a tuple for a satisfaction index as a function of a component index of the sentence, a subject of the sentence, and a number of users having a comment in the social media feeds about a subject of the sentence, the component index based on a weightage of an adjective in the sentence that is representative of the sentiment, a degree of intensity of the adjective, and the number of users.

5. The digital manufacturing system of claim 1, wherein to identify a sentence from the extracted text containing a question, the text analyzer is to:

identify a verb in the sentence;

determine whether the verb appears before a subject in the sentence; and in response to determining the verb appears before the subject, determine the sentence contains the question.

6. The digital manufacturing system of claim 5, wherein to identify a sentence from the extracted text containing a question, the text analyzer is further to:

determine whether the sentence contains punctuation indicative of a question; and determine whether the contains a predetermined word indicative of a question.

7. The digital manufacturing system of claim 1, wherein the enterprise resource planning subsystem is to:

determine whether a subject of the sentence is determined to have negative sentiment; and in response to determining the subject is related to the negative sentiment, invoke a redesign of an attribute of the product related to the subject via the enterprise resource planning subsystem.

8. The digital manufacturing system of claim 1, wherein to connect to the different social media applications and retrieve the social media feeds, the feed adapters are each to:

create a user ID for a respective social media application;

create a social media feed in the respective social media application based on at least one keyword; and subscribe to the social media feed according to the user ID.

9. The digital manufacturing system of claim 1, comprising:

a production line monitoring tool to receive manufacturing updates based on the NFC tracking; and display, via the web portal, a real-time production line in a graphical representation, showing the manufacturing updates based on the NFC tracking.

10. The digital manufacturing system of claim 1, comprising:

a digital manufacturing tool to define key performance indicators based on manufacturing processes; and generate alerts in response to a breach of a threshold value of at least one of the key performance indicators.

11. The digital manufacturing system of claim 1, comprising:

a machine learning subsystem to execute at least one machine learning function to estimate when to provide preventive maintenance to the machines based on usage and historic data.

12. A system comprising:

a manufacturing execution subsystem to:

generate an identifier for a manufacturing resource plan for manufacturing a product; and communicate the manufacturing resource plan and production steps for manufacturing the product to a production control subsystem controlling machines performing the manufacturing of the product according to the manufacturing resource plan and the production steps, the production control subsystem storing the identifier in a near field communication chip attachable to the product during the manufacturing to provide real-time tracking of the manufacturing throughout the steps; and feed adapters to:

determine attributes of a product;

generate keywords from the attributes for the product;

connect to social media applications, where each of the feed adapters connects to a different one of the social media applications; and retrieve social media feeds from the social media applications based on the keywords generated from the attributes of the product;

extractors to extract text related to the product from the social media feeds, the social media feeds including a text feed and a video feed;

a text analyzer to:

apply natural language processing to the extracted text, the natural language processing identifying a sentence from the extracted text containing a question and a sentence not containing a question;

for the sentence determined to contain a question, determine an answer to the question from a repository, and post the answer to at least one of the social media feeds; and for the sentence determined not to contain a question, determine a sentiment for the sentence.

13. The system of claim 12, wherein to determine a sentiment for the sentence determined not to contain a question, the text analyzer is to:

calculate an estimate of the sentiment of a comment in the sentence based on an adjective in the sentence that is representative of the sentiment; and calculate an estimate of a degree of intensity of the adjective, the degree of intensity of the adjective being a measure of an amount of positive or negative intent of the comment.

14. The system of claim 13, wherein to calculate an estimate of the sentiment of a comment in the sentence, the text analyzer is to:

calculate a component index of the sentence as a function of weightage of the adjective and the degree of the adjective, the weightage of the adjective based on a number of users having a comment in the social media feeds about a subject of the sentence.

15. The system of claim 12, wherein to determine a sentiment for the sentence determined not to contain a question, the text analyzer is to:

determine a tuple for a satisfaction index as a function of a component index of the sentence, a subject of the sentence, and a number of users having a comment in the social media feeds about a subject of the sentence, the component index based on a weightage of an adjective in the sentence that is representative of the sentiment, a degree of intensity of the adjective, and the number of users.

16. The system of claim 12, wherein to identify a sentence from the extracted text containing a question, the text analyzer is to:

identify a verb in the sentence;

determine whether the verb appears before a subject in the sentence; and in response to determining the verb appears before the subject, determine the sentence contains the question.

17. The system of claim 16, wherein to identify a sentence from the extracted text containing a question, the text analyzer is further to:

determine whether the sentence contains punctuation indicative of a question; and determine whether the contains a predetermined word indicative of a question.

18. The system of claim 12, wherein to connect to the social media applications and retrieve the social media feeds, the feed adapters are each to:

create a user ID for a respective one of the social media applications;

create the social media feed in the respective one of the social media applications based on at least one of the keywords; and subscribe to the respective one of the social media feeds according to the user ID.

19. A computer-implemented method comprising:

receiving product configuration information for a product;

generating a production order based on the product configuration information;

determining a manufacturing resource plan and production steps for manufacturing the product;

generating an identifier for the manufacturing resource plan;

communicating the manufacturing resource plan and the production steps to a production control subsystem controlling machines performing the manufacturing of the product according to the manufacturing resource plan and the production steps, the production control subsystem storing the identifier in a near field communication chip attachable to the product during the manufacturing to provide real-time tracking of the manufacturing throughout the steps;

determining attributes of a product;

generating keywords from the attributes for the product;

connecting to different social media applications;

retrieving social media feeds from the social media applications based on the keywords generated from the attributes of the product;

extracting text related to the product from the social media feeds, the social media feeds including a text feed and a video feed;

identifying a sentence from the extracted text containing a question and a sentence not containing a question;

for the sentence determined to contain a question, determining an answer to the question from a repository, and posting the answer to at least one of the social media feeds; and for the sentence determined not to contain a question, determining a sentiment for the sentence.

20. The computer-implemented method of claim 19, wherein determining a sentiment for the sentence determined not to contain a question comprises:

calculating an estimate of the sentiment of a comment in the sentence based on an adjective in the sentence that is representative of the sentiment; and calculating an estimate of a degree of intensity of the adjective, the degree of intensity of the adjective being a measure of an amount of positive or negative intent of the comment.

* * * * *